United States Patent [19]

Fredriksson

[11] Patent Number: 4,606,241
[45] Date of Patent: Aug. 19, 1986

[54] ADJUSTABLE CRANK ASSEMBLY

[76] Inventor: Verner Fredriksson, Industrigatan 35, S-335 00 Gnosjö, Sweden

[21] Appl. No.: 604,938

[22] Filed: Apr. 27, 1984

[30] Foreign Application Priority Data

Apr. 29, 1983 [SE] Sweden ................................ 8302431

[51] Int. Cl.$^4$ .............................................. G05G 1/14
[52] U.S. Cl. ...................................... 74/594.1; 74/600; 272/73; 272/DIG. 4
[58] Field of Search ....................... 74/594.1, 546, 600; 272/73, DIG. 4

[56] References Cited

U.S. PATENT DOCUMENTS

| 385,717 | 7/1888 | Kibbe | 74/546 |
| 393,837 | 12/1888 | Kibbe | 74/600 |
| 3,789,696 | 2/1974 | Beam, III | 74/594.1 |

FOREIGN PATENT DOCUMENTS

| 287385 | 2/1965 | Netherlands | 272/73 |
| 814128 | 5/1959 | United Kingdom | 272/73 |

Primary Examiner—Gary L. Smith
Assistant Examiner—Rodney M. Lindsey
Attorney, Agent, or Firm—Burns, Doane, Swecker & Mathis

[57] ABSTRACT

A crank assembly having an adjustment member extending approximately parallel to and fixed to one end of a crank lever, a bearing arrangement adjustably affixed to said adjustment member, a pivot arm rotatably connected to said bearing arrangement, a pedal and anchorage means for adjustably positioning the pedal on the pivot arm.

7 Claims, 12 Drawing Figures

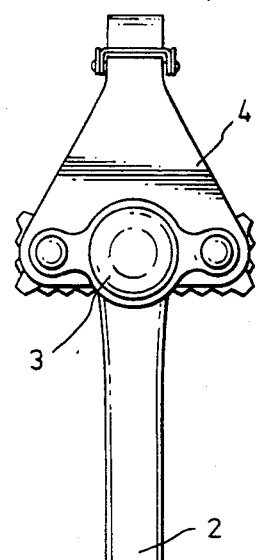
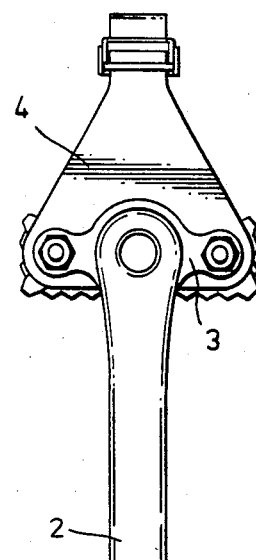
Fig. 3.
Fig. 4.
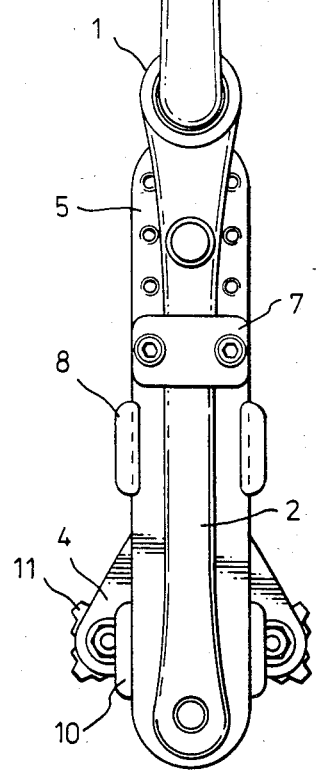
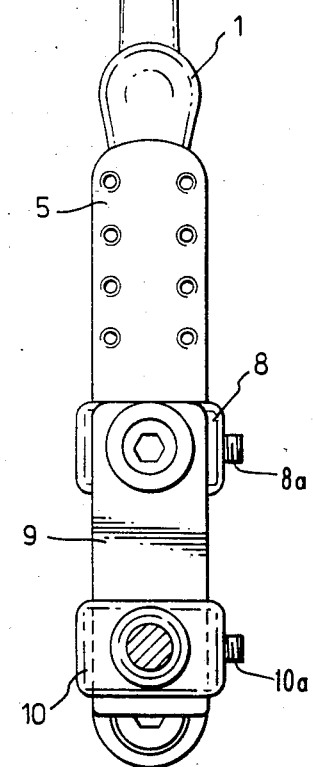

ADJUSTABLE CRANK ASSEMBLY

TECHNICAL FIELD

The present invention relates to an adjustable crank assembly which is primarily intended for training or exercise equipment and which has two oppositely directed crank levers on which pedals are disposed, the crank assembly being designed such that the vertical position and diameter of the crank movement of one of the pedals may be adjusted within broad limits.

THE STATE OF THE ART

In many types of training and exercise equipment, use is made of crank assemblies with pedals which the user cranks round, often against an adjustable resistance or brake. As a rule, the crank assembly is completely rigid in design and construction, so that, as a result, both pedals will describe equally large circular movements about a common axis. As regards healthy people without injury to the knee joints, hips or the like, the above-outlined design of the crank assembly functions excellently.

However, in many situations it is necessary that partially handicapped people suffering from, for example, hip injuries, knee joint injuries and so on be able to exercise by using physical exercise equipment of the type outlined above. In such a situation, the circular movements which are equally large for both legs may cause problems and may, in certain cases, be completely impossible if, for example, the patient's one leg cannot be lifted sufficiently to permit the cranking motion for this leg to pass above the upper dead point. In a corresponding manner, the movement facility of the patient may be severely limited also in the direction of diameter of the movement, with the result that a conventional crank assembly cannot be used at all.

OBJECT OF THE INVENTION

The object of the present invention is to realise an adjustable crank assembly in which both the diameter of the one cranking movement and the vertical position thereof may be varied in relation to the center of the crank assembly proper.

SOLUTION

This object is achieved according to the present invention by a crank assembly comprising two crank levers extending in opposite directions from a central portion, or hub, the levers being connected to operative members such as pedals, handles or the like, the crank assembly being characterized in that there is provided a joint on the one crank lever which is adjustable in the longitudinal direction thereof, a pivot arm being pivotally retained in the joint and the one operative portion, or pedal, being disposed on the pivot arm.

In order that the vertical position of the cranking movement of one side of the crank assembly be adjustable, the present invention is further characterised in that the one operative portion or pedal is shiftable along the pivot arm, which is freely pivotal in relation to the joint.

According to the present invention, it is also appropriately applicable that the joint is shiftably disposed along an adjustment member which is approximately parallel to the one crank lever and is fixedly retained therein.

ADVANTAGES

As a result of the design of the subject matter of the present invention, the great advantage will be attained that the adjustment member may simply be moved from one side of the crank assembly to the other. Furthermore, the present invention allows for the supplementation of a conventional crank assembly with the adjustment member so as to form thereby the subject matter of the present invention.

DESCRIPTION OF THE ACCOMPANYING DRAWINGS

The nature of the present invention and its aspects will be more readily understood from the following brief description of the accompanying drawings, and discussion relating thereto.

In the accompanying drawings:

FIGS. 3 and 4 are side elevations of the crank assembly in its entirety;

DESCRIPTION OF PREFERRED EMBODIMENT

Figure 1:
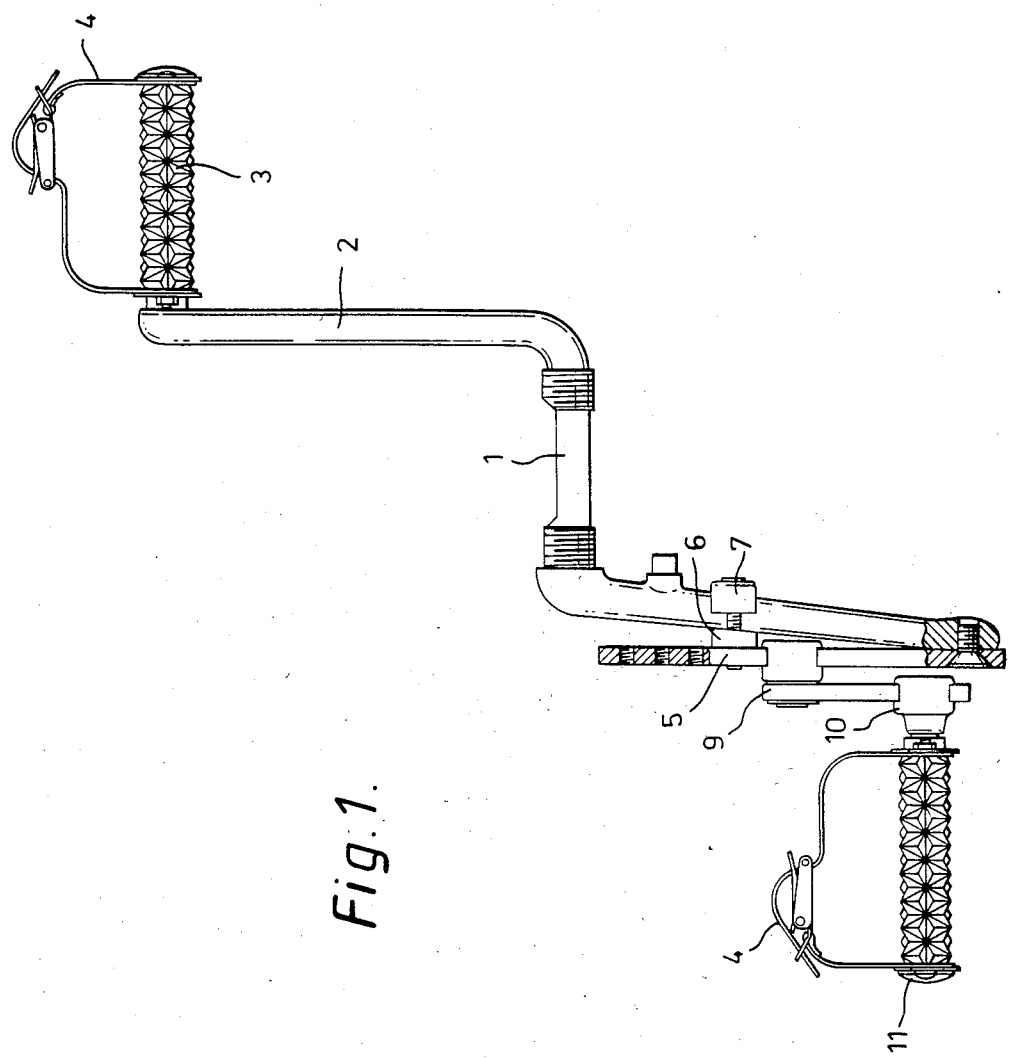
FIG. 1 is, on a small scale, a crank assembly according to a preferred embodiment of the present invention.
Figure 2:
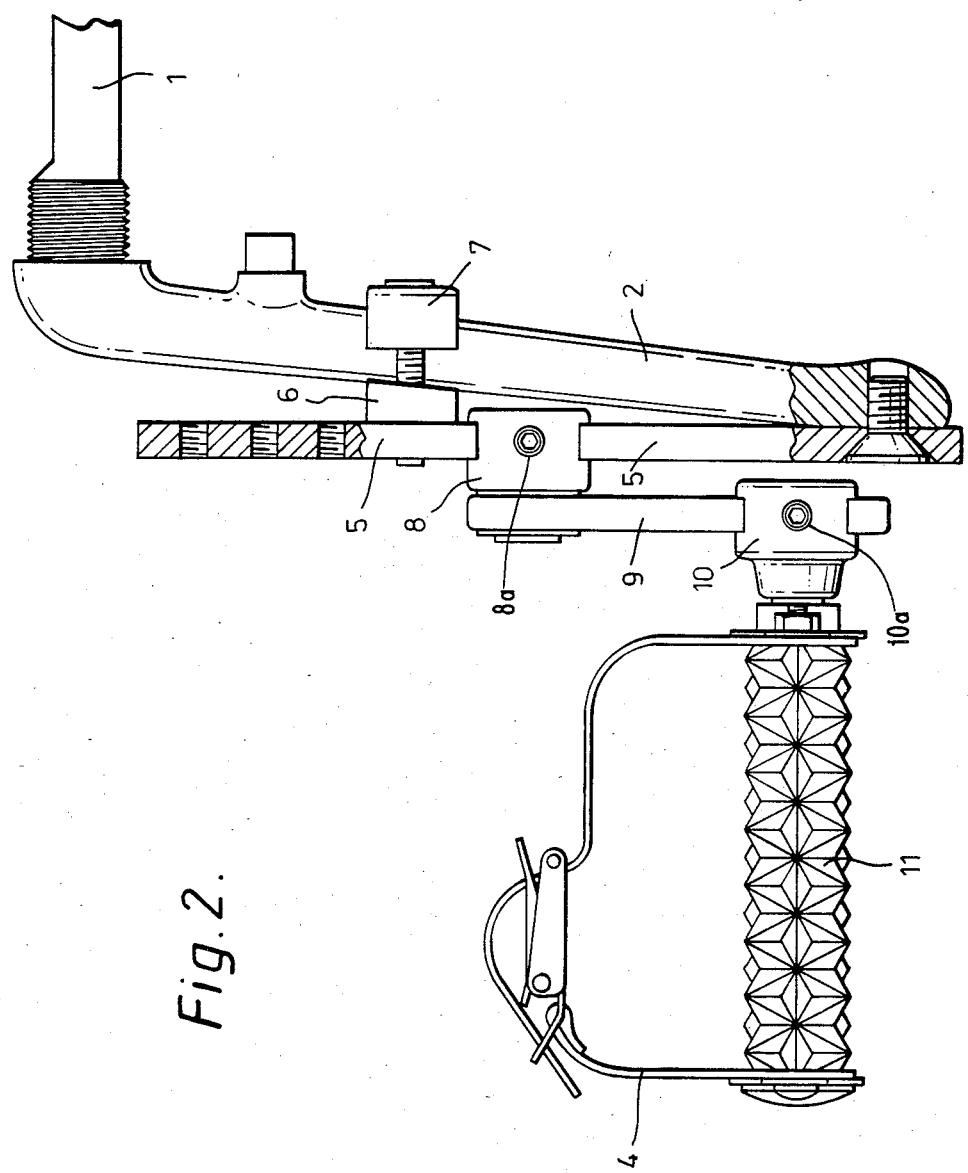
FIG. 2 is a partial section of an adjustable half of the crank assembly of FIG. 1.

Referring to FIGS. 1 and 2, a preferred embodiment of the present invention comprises a central portion, or hub having an axle 1, from which two crank levers 2 extend in opposite directions. The hub and the crank levers may be designed in fully conventional manners and the hub serves as a journal for the crank assembly proper. At the free end of the one crank lever, there is disposed a pedal 3, but this may, naturally be replaced by a handle of suitable design if the crank assembly is to be used for arm and back exercises. The pedal 3 may be of conventional type and is rotatably disposed in its bracket about an axis which is parallel to the longitudinal axis of the hub. Furthermore, the pedal is suitably provided with a strap 4 which may be tightened to secure a patient'foot in place.

The opposite crank lever 2 has no pedal disposed at its free end. Instead, at this end (for example in the mounting hole for the pedal) there is disposed the end of an adjustment member 5 which extends throughout substantially the entire length of the crank lever and which is located on a radial plane to the central axis of the axle 1 of the crank assembly. Furthermore, the adjustment member 5 has a further anchorage point in the crank lever 2 in that there is disposed, between the adjustment member and the crank lever, a spacer 6 which is of a design which is complementary to the contour of the crank lever 2. The spacer 6 cooperates with a clamping member 7 and a pair of screws which suitably extend through both the clamping member and the spacer and further into the adjustment member proper, so that tightening of these screws will clamp the crank lever 2 between the clamping member and the spacer. In this way, the adjustment member 5 may be positionally fixed very accurately and in a manner so as efficiently to take up the loading in relation to the crank lever.

As an alternative to the above-outlined design and fixation of the adjustment member 5, the spacer 6 and the clamping member 7 may, naturally, be offset in relation to one another in the longitudinal direction of the adjustment member. However, in such an alternative, the spacer 6 should be fixedly retained by the adjustment member or the crank lever by some form of separate anchorage members. Also in this variation, use is made of the clamping member and the corresponding screws for urging the inner end of the adjustment member 5 into positionally fixing cooperation, immediately with the spacer 6 and, naturally, also indirectly with the crank lever 2. As a further alternative, the one crank lever 2 may be designed so as it directly assumes the function of the adjustment member 5, whereby a separate adjustment member is superfluous.

The adjustment member 5 may be of rectangular cross-section there being disposed thereon a bearing arrangement 8 which has a slot which corresponds to the cross-sectional configuration of the adjustment member, whereby the bearing arrangement will be shiftable along the longitudinal direction of the adjustment member. Naturally, to allow for such a shifting, the spacer 6 is designed with smaller width than is the case for the adjustment member proper and, furthermore, the bearing arrangement 8 has, on its side turned to face the spacer 6, a an opening through which the spacer may pass when the bearing arrangement 8 is shifted along the adjustment member. The bearing arrangement 8 is releasably secured to the adjustment member 5 with the tightening of a set screw 8a.

On the bearing arrangement 8, there is disposed a projecting stub-shaft on which a pivot arm 9 is mounted. The pivot arm 9 is freely pivotal throughout a complete revolution about the stub shaft of the bearing arrangement and is disposed in a direction which is essentially parallel to the adjustment 5. As a result, the pivot arm 9 will be movable in a radial plane to the center line of the axle 1 of the crank assembly.

The one pedal 11 of the crank assembly is rotatably mounted on an anchorage 10 which is shiftably disposed along the longitudinal direction of the pivot arm 9. The anchorage 10 is also lockable in any optional position on the pivot arm. This, naturally, also relates to the bearing arrangement 8 which, thus, may be fixedly locked in any optional position along the adjustment member 5. The anchorage 10 is releasably locked into place upon the pivot arm 9 with the tightening of a set screw 10a.

On rotation of the crank assembly, the pivot arm with the pedal 11 will depend under the action of gravity, whereby the movement circle of the pedal will be shifted downwardly a corresponding extend. Of course, this shifting may also make an angle with the vertical under the action of a more or less horizontal force, for example from a foot resting on the pedal.

Figure 5:
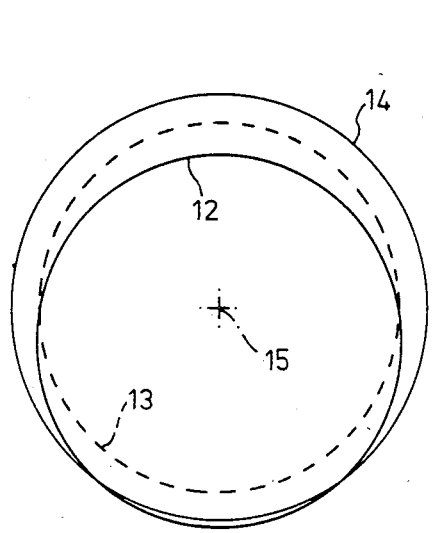
FIG. 5 is a diagram of the cranking movements of both pedals of the crank assembly when the diameter of the adjustable cranking movement is relatively large and the vertical position relatively high.

As a result of shifting of the bearing arrangement 8 and the anchorage 10 along the adjustment member 5 and the pivot arm 9, respectively, a whole series of movement diagrams may be realized for the other pedal 11 of the crank assembly. If, for example, the bearing arrangement 8 is shifted to a position proximal to the free end of the crank lever 2 and, at the same time, the anchorage 10 is shifted to a position proximal to the bearing arrangement 8, the pedal 11 will describe a circular movement which is shown in FIG. 5 under reference number 12. Corresponding, the broken circle 13 shows the movement diagram for the bearing arrangement 8, while the circle 14 shows the movement diagram for the pedal 3 on the other crank lever 2. The central axis of the hub of the crank assembly has been marked, in this drawing figure, with reference numeral 15.

Figure 6:
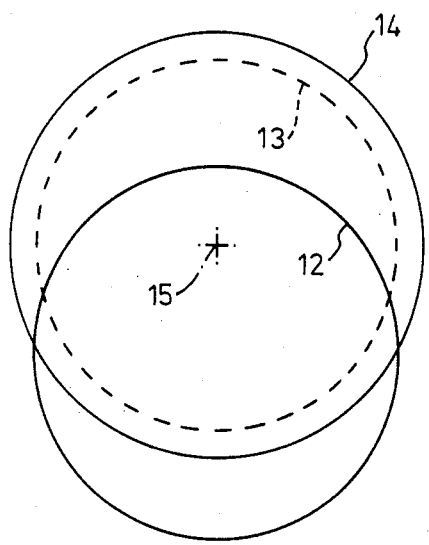
FIG. 6 is a diagram of the same form of cranking movement, i.e., a cranking movement with a relatively large diameter on the adjustable side, the vertical position, however, of this cranking movement having been shifted downwardly to a considerable degree.

If the bearing arrangement 8 remains in a position close to the end of the crank lever 2, while the anchorage 10 is shifted to a position in the proximity of the free end of the pivot arm 9, i.e. at a considerable distance from the bearing arrangement 8, the movement diagram for the adjustable pedal 11 will have the appearance as shown in FIG. 6. In this Figure, the different reference numerals for the movement circles relates to the same components as in FIG. 5.

Figure 7:
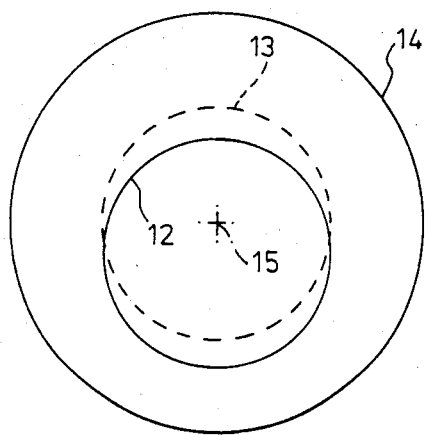
FIG. 7 is a movement diagram, in which the adjustable cranking movement has been given a small diameter and relatively high vertical position.

If the bearing arrangement 8 is shifted to a position proximal to the hub 1, this will have the result that the adjustable pedal 11 will describe a circular movement of a considerably smaller diameter. FIG. 7 illustrates an adjustment position where, thus, the bearing arrangement 8 is located relatively close to the central axis of the crank assembly, at the same time as the anchorage 10 is set in the proximity of the bearing arrangement 8. This adjustment position entails, hence, a small cranking diameter for the adjustable pedal, at the same time as the center of this movement has been but insignificantly shifted downwardly.

Figure 8:
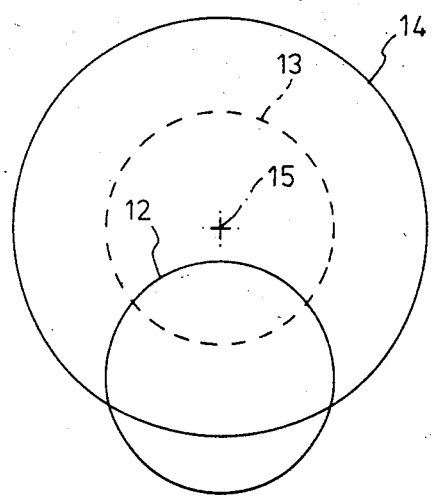
FIG. 8 is a corresponding movement diagram in which, however, the vertical position of the adjustable cranking movement has been greatly shifted downwardly.
Figure 5A:
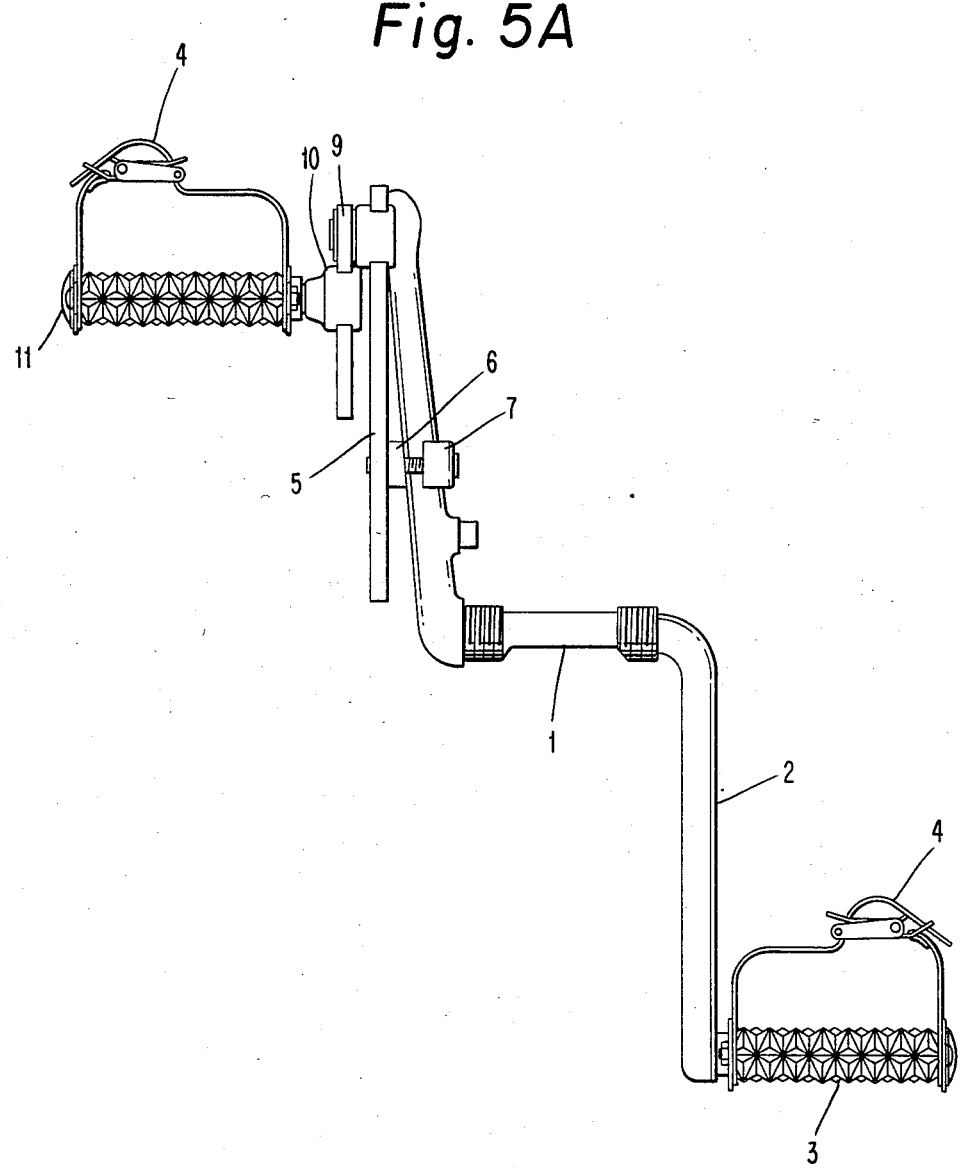
FIG. 5A is the crank assembly of FIG. 1 with the crank assembly rotated 180° and adjusted so as to provide the paths of movement of FIG. 5.
Figure 6A:
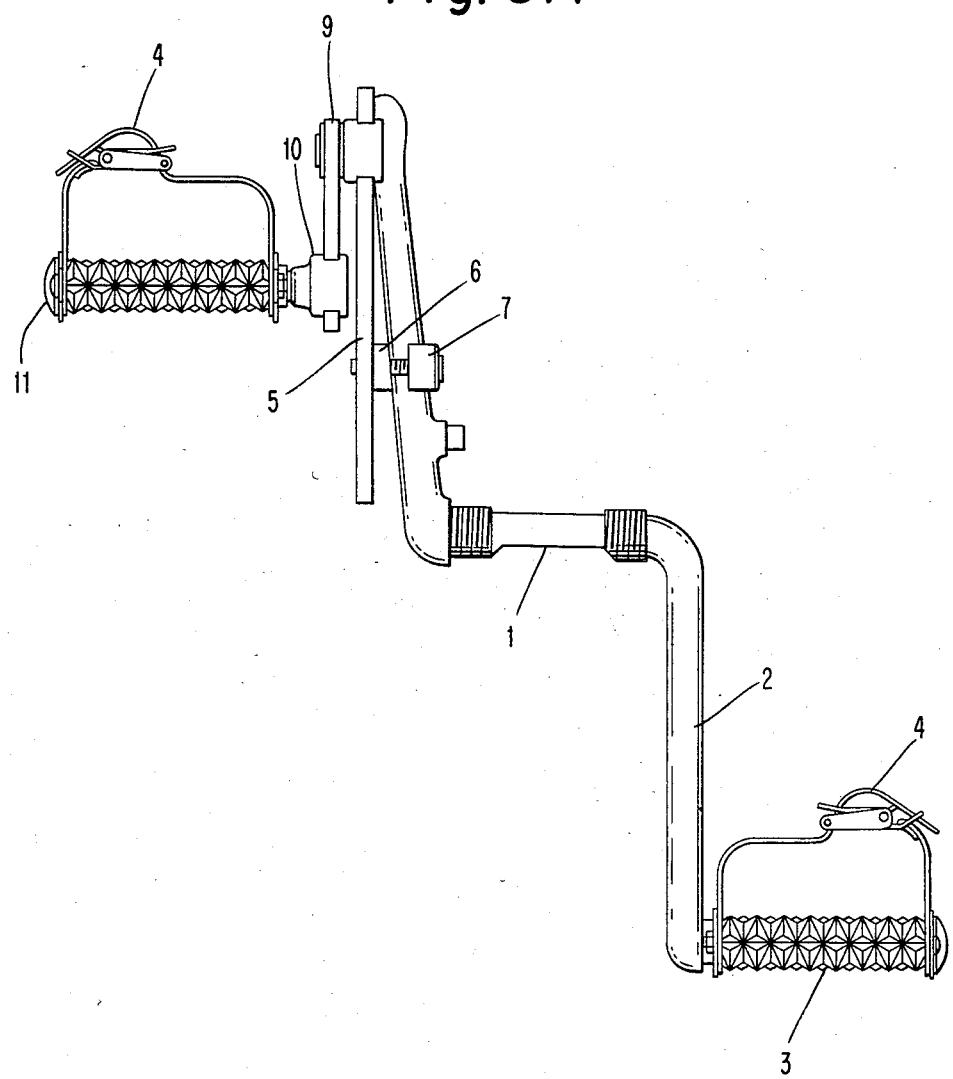
FIG. 6A is the crank assembly of FIG. 1 with the crank assembly rotated 180° and adjusted so as to provide the paths of movement of FIG. 6.
Figure 7A:
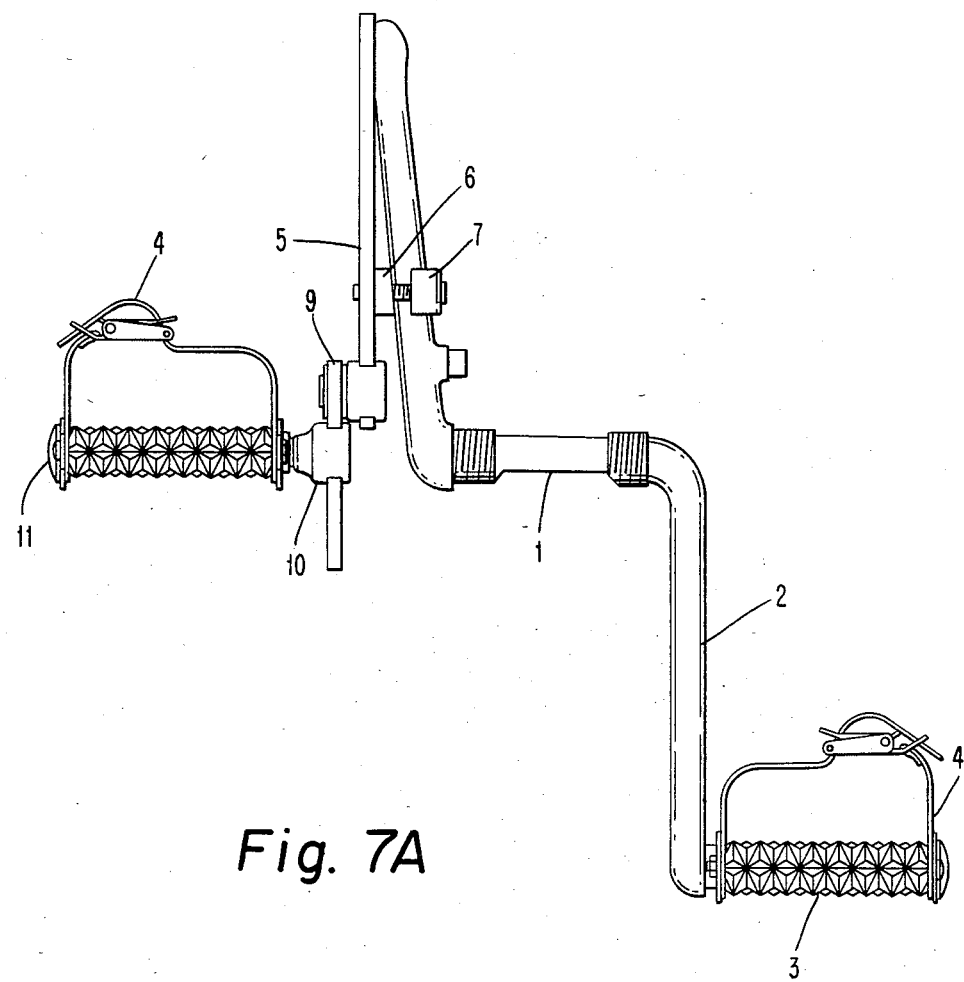
FIG. 7A is the crank assembly of FIG. 1 with the crank assembly rotated 180° and adjusted so as to provide the paths of movement of FIG. 7.
Figure 8A:
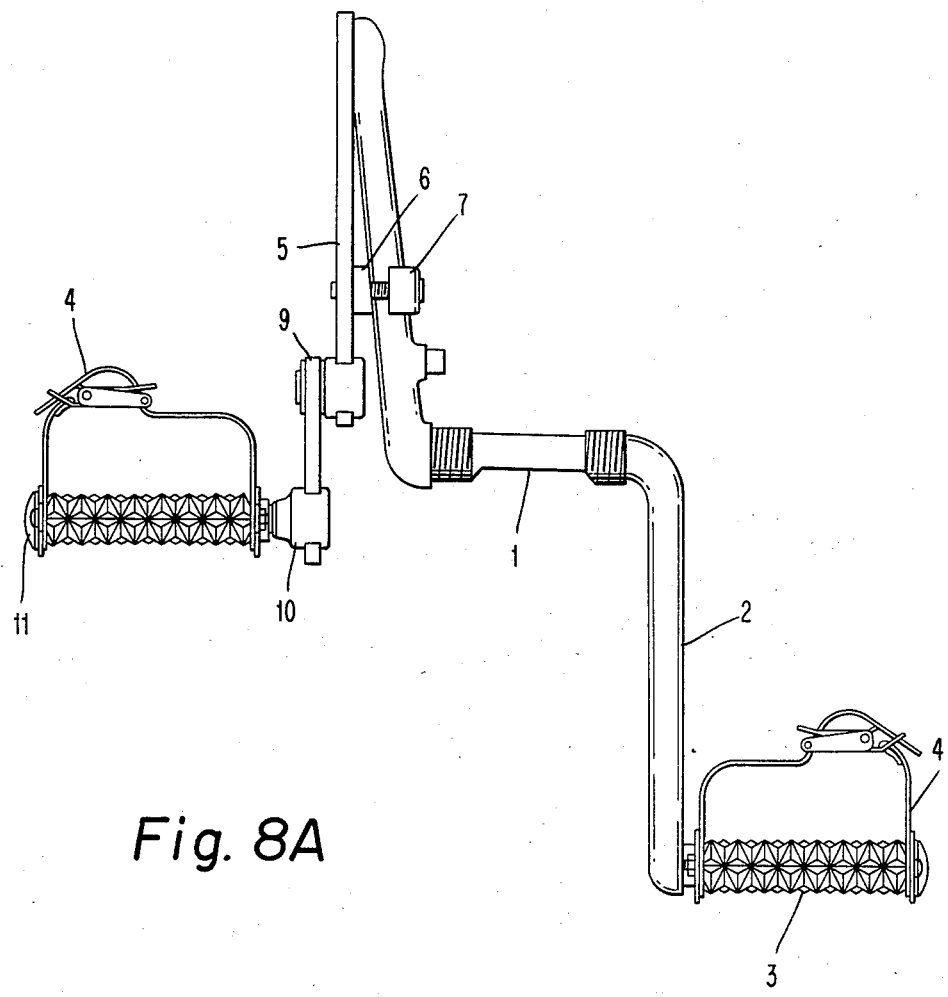
FIG. 8A is the crank assembly of FIG. 1 with the crank assembly rotated 180° and adjusted so as to provide the paths of movement of FIG. 8.

With the same adjustment for the bearing arrangement 8 as in the alternative according to FIG. 7, but with the anchorage 10 moved to the free end of the pivot arm 9, there will be realized a movement diagram as shown in FIG. 8. It will be apparent from this FIG. that the diameter of the cranking movement of the pedal 11 is still small, while, on the other hand, the vertical position of the cranking movement has been shifted greatly downwardly, even so far down that the cranking movement never passes over the center of the axle 1 of the crank assembly.

A further radial inward shifting of the bearing arrangement 8 would further reduce the diameter of the adjustable cranking movement. If, in such an alternative, the pivot arm 9 were, further, to be given increased length, the vertical position for this cranking movement which is smaller in diameter would be shifted even further downwardly than is shown on FIG. 8.

To allow for rapid adjustment of the crank assembly to suit the needs of a particular patient, both the adjustment member 5 and and pivot arm 9 are suitably provided with longitudinal adjustment scales.

The present invention should not be considered as restricted to that described above and shown on the Drawings, many modifications being possible without departing from the spirit and scope of the appended claims.

It is to be understood that the present invention may be embodied in other specific forms without departing from the spirit or essential characteristics of the present invention. The preferred embodiment is therefore to be considered illustrative and not restrictive. The scope of the invention is indicated by the appended claims rather than by the foregoing description and all changes and variations which come within the meaning and range of the claims are therefore intended to be embraced therein.

I claim:

1. A crank assembly adjustable both as to the crank radius and the height of crank movement, comprising:
   a hub assembly including an axle;
   a crank lever affixed to said axle and having a length;
   a pivot arm rotatably connected to a bearing arrangement;
   an adjustment member affixed to and generally parallel to said crank lever for adjustably positioning said bearing arrangement at positions alongside said crank lever, said bearing arrangement being slidably connected to said adjustment member and provided with means for securing said bearing arrangement to said adjustment member at positions along said adjustment member;
   a pedal; and
   anchorage means for adjustably positioning said pedal on said pivot arm.

2. The crank assembly of claim 1, wherein said adjustment member includes a substantially rectangular plate having an end connected to an end of said crank lever, said adjustment member provided with a clamping member clamping said rectangular plate to said crank lever with a spacer interposed between said rectangular plate and said crank lever, said bearing arrangement including a recess which slidably receives said rectangular plate and an opening through which said spacer can pass.

3. The crank assembly of claim 1, wherein said adjustment member together with said pivot arm is longer than said crank lever, whereby a path of movement of said pedal may remain below said axle.

4. The crank assembly of claim 1, wherein said adjustment member has a length approximately equal to said length of said crank lever.

5. The crank assembly of claim 1, further comprising:
   a second crank lever affixed to said axle and extending from said axle in a direction opposite of the other crank lever;
   a second pedal rotatably connected to an end portion of said second crank arm remote from said axle.

6. The crank assembly of claim 5, wherein said adjustment member together with said pivot arm is longer than said other crank lever, whereby a path of movement of said pedal of said other crank lever may remain below said axle.

7. The crank assembly of claim 5, wherein said adjustment member has a length approximately equal to said length of said other crank lever.

* * * * *